July 20, 1954  R. E. BOULTON  2,684,163
MULTIPURPOSE SIDE-DUMP ATTACHMENT FOR TRACTORS
Filed March 19, 1951  5 Sheets-Sheet 1

Inventor
ROBERT E. BOULTON
By
Attorney

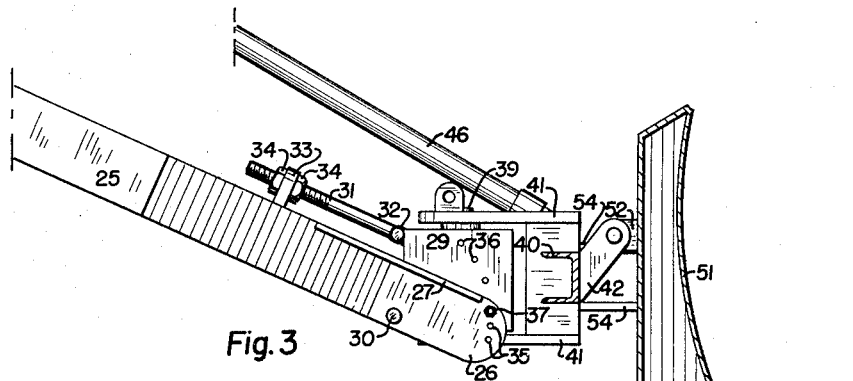
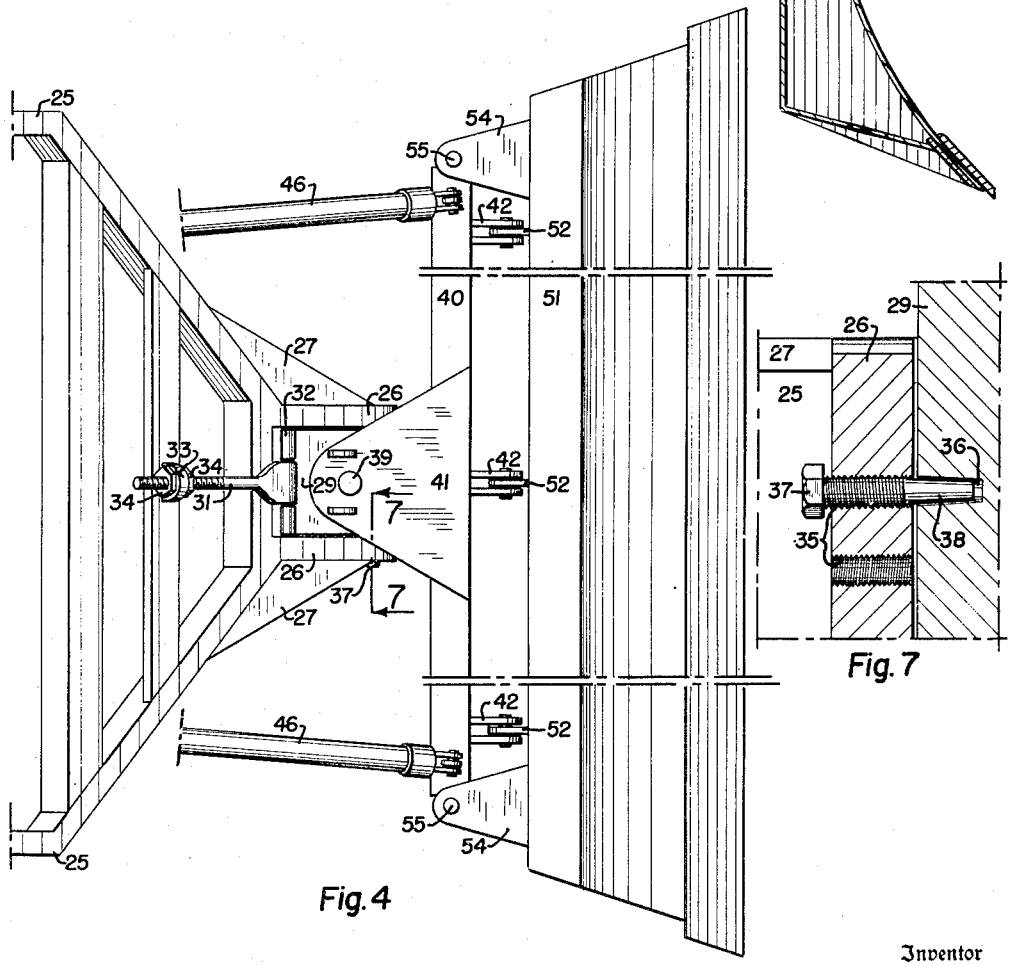

July 20, 1954  R. E. BOULTON  2,684,163
MULTIPURPOSE SIDE-DUMP ATTACHMENT FOR TRACTORS
Filed March 19, 1951  5 Sheets-Sheet 4

Inventor
ROBERT E. BOULTON
By
Attorney

July 20, 1954 R. E. BOULTON 2,684,163
MULTIPURPOSE SIDE-DUMP ATTACHMENT FOR TRACTORS
Filed March 19, 1951 5 Sheets-Sheet 5

Inventor
ROBERT E. BOULTON
By
Attorney

Patented July 20, 1954

2,684,163

UNITED STATES PATENT OFFICE 2,684,163

MULTIPURPOSE SIDE-DUMP ATTACHMENT FOR TRACTORS

Robert E. Boulton, Rifle, Colo.

Application March 19, 1951, Serial No. 216,319

2 Claims. (Cl. 214—140)

This invention relates to earth working and handling attachments for conventional tractors, and more particularly to a multi-purpose attachment efficiently and conveniently applicable to a variety of uses and to accomplish various specific functions, and has as an object to provide an improved attachment of simple, practical construction and wide adaptability.

A further object of the invention is to provide an improved tractor attachment operable in powered relation with the tractor as a bulldozer, angledozer, grader, excavator, ditcher, and forward-dump or side-dump loader.

A further object of the invention is to provide an improved tractor attachment characterized by novel means for adjustably and interchangeably associating a blade or shovel in powered relation with the tractor.

A further object of the invention is to provide an improved tractor attachment characterized by means for regulating the vertical plane aspect of an attached blade or shovel as an incident of blade or shovel angular adjustment in the horizontal plane.

A further object of the invention is to provide an improved shovel or blade mounting providing adjustability about perpendicularly-related axes in a tractor attachment.

A further object of the invention is to provide an improved tractor attachment of the character described that is efficient in the application of tractor power to desired effect, that is rugged and durable in adaptability to an extensive range of diverse uses, that is susceptible of operative association with various styles and makes of conventional tractors, and that is characterized by operative flexibility of high utility.

With the foregoing and other objects in view, my invention consists in the construction, arrangement, and combination of elements as hereinafter set forth, pointed out in my claims, and illustrated by the accompanying drawings, in which—

Figure 1:
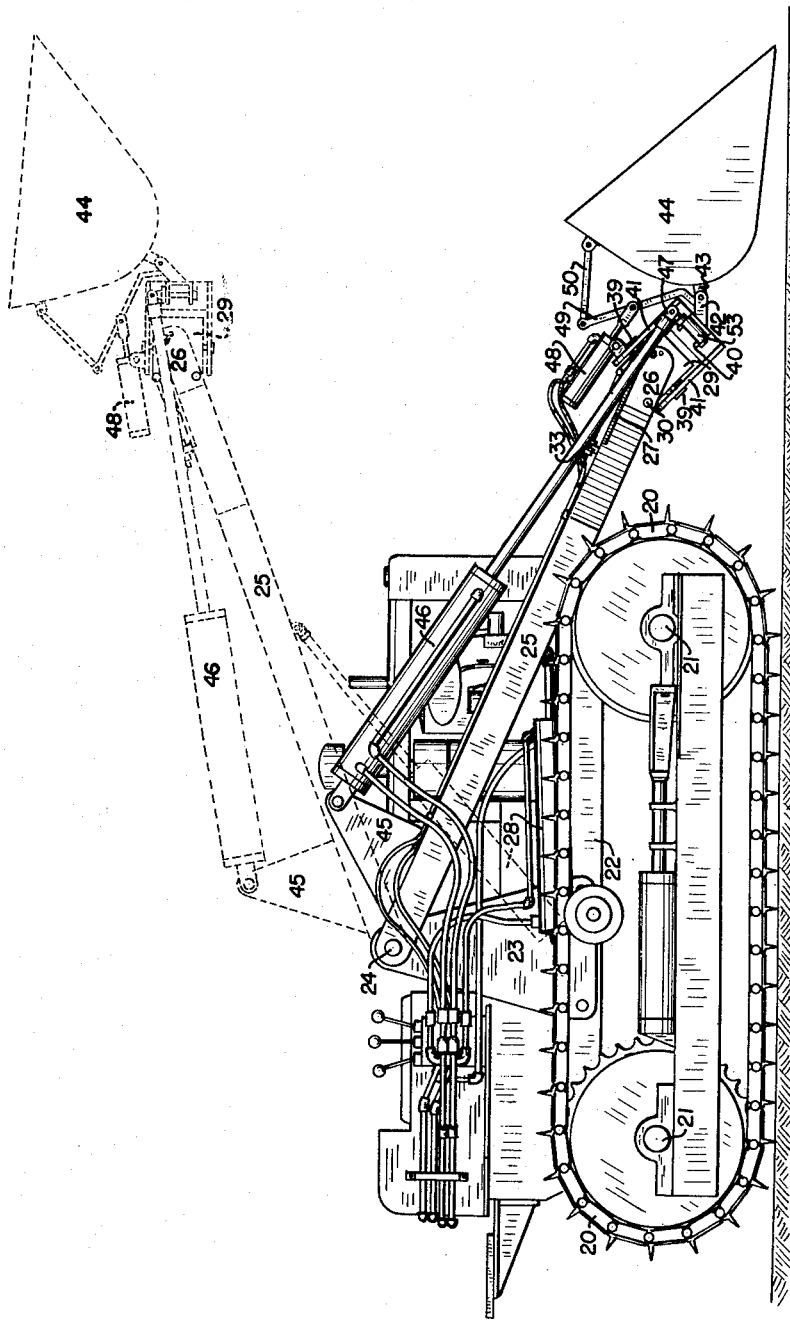
Figure 2:
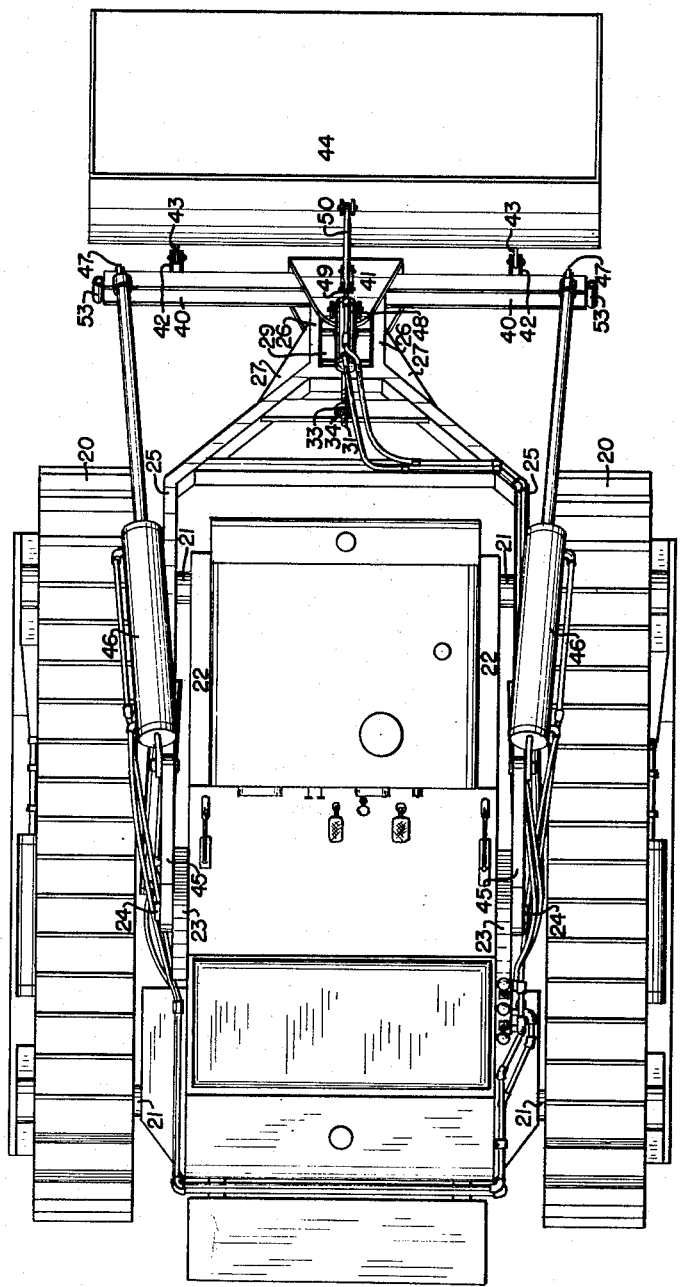
Figure 5:
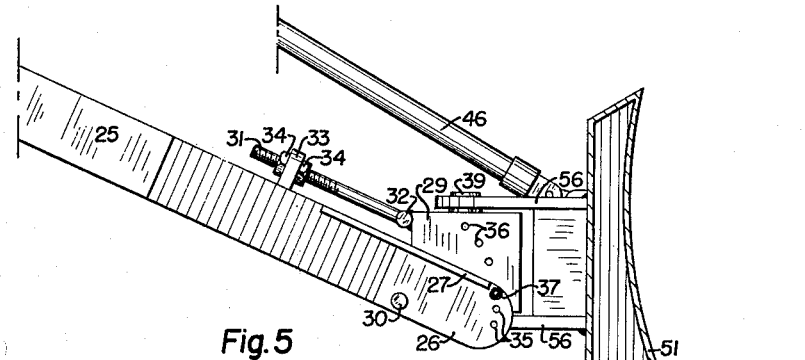
Figure 6:
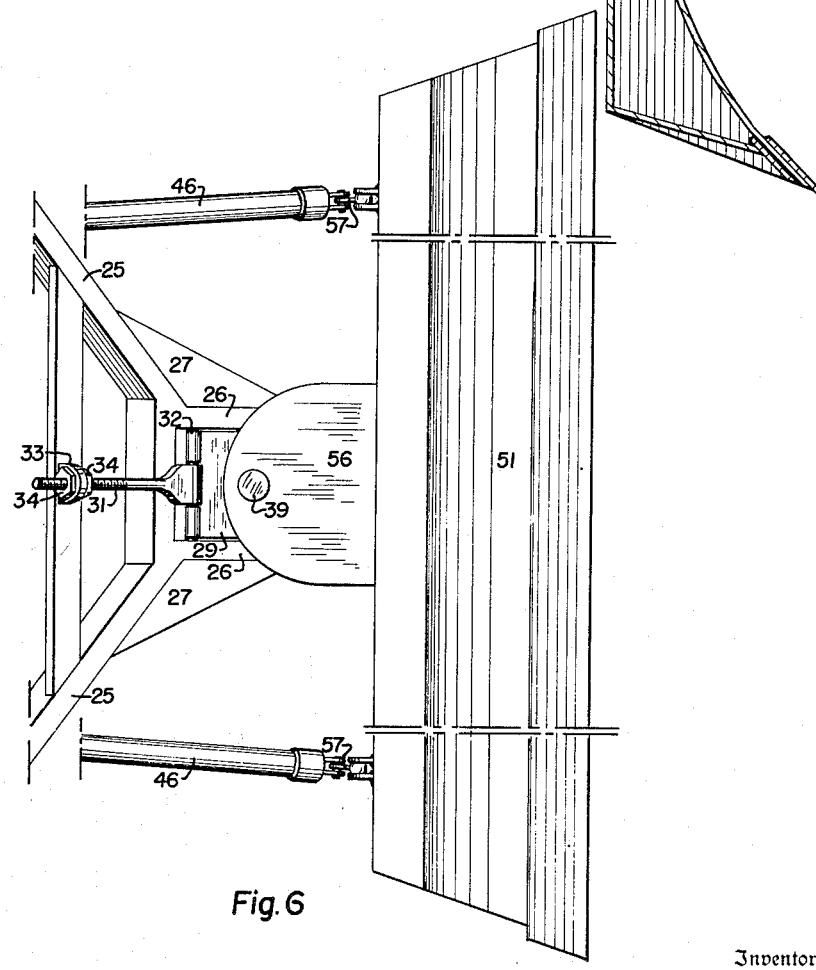
Figure 8:
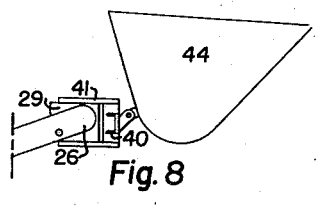
Figure 9:
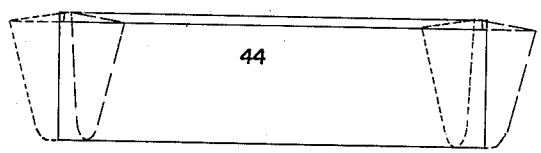
Figure 10:
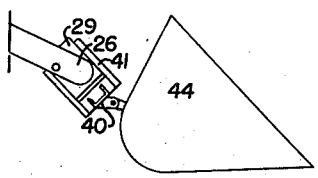
Figure 11:
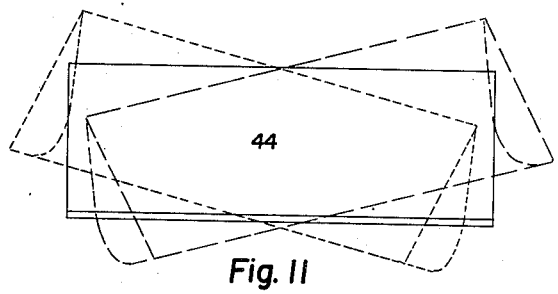
Figure 12:
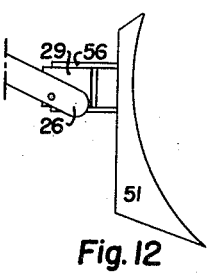
Figure 13:
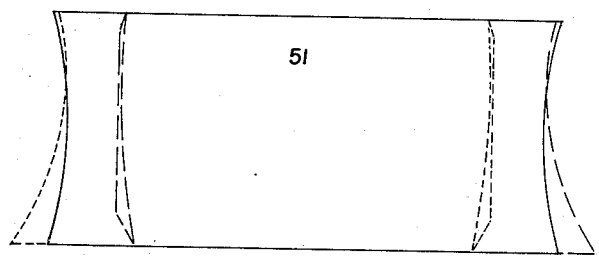
Figure 14:
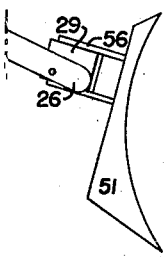
Figure 15:
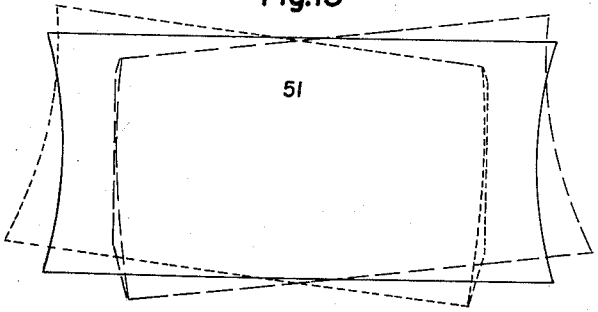

Figure 1 is a side elevation of a typical embodiment of the invention as shovel-equipped in operative association with a conventional tractor, an altitudinally-alternative position within the operative range of the attachment being indicated by broken lines. Figure 2 is a plan view of the organization according to Figure 1. Figure 3 is a fragmentary, detail elevation, partly in section and on an enlarged scale, of the attachment forward end shown in the preceding views as equipped with a balde in substitution for the shovel element. Figure 4 is a plan view of the organization according to Figure 3, portions of the blade and its support being broken away to conserve space. Figure 5 is a view similar to Figure 3 illustrating an alternative interchangeable blade mounting within the contemplation of the invention. Figure 6 is a view similar to Figure 4 of the alternative blade mounting according to Figure 5. Figure 7 is a fragmentary, detail section, on a further enlarged scale, taken substantially on the indicated line 7—7 of Figure 4. Figure 8 diagrammatically portrays an adjusted relation of the shovel element and its mounting in elevated position and Figure 9 represents the vertical plane aspect of the so-positioned shovel element in various of its horizontal plane adjustments. Figure 10 illustrates the shovel element and mounting of Figure 8 in lowered position and Figure 11 represents the vertical plane aspect of the so-positioned shovel element in various of its lowered horizontal plane adjustments. Figure 12 represents a blade and associated mounting in the lowered position of Figure 10 and in a particular angular adjustment of the mounting different from that of said latter view and Figure 13 represents the vertical plane aspect of the so-positioned blade in various of its horizontal plane adjustments. Figure 14 shows the organization according to Figure 12 in an angular adjustment of the mounting different from any previously illustrated and Figure 15 represents the vertical plane aspect of the so-positioned blade in various of its horizontal plane adjustments.

Typical of power units wherewith the improved attachment is susceptible of operative association, a conventional tractor is illustrated in Figures 1 and 2 as including spacedly-parallel, crawler-type treads 20 operatively associated with axles 21 and therethrough supporting a rigid frame 22 carrying the prime mover, controls, adjuncts and facilities appurtenant to the unit, all in conformity with long-established practices of the pertinent art.

Fixed to and similarly upstanding above side members of the frame 22 between the axles 21, a pair of like brackets 23 mount and fixedly support adjacent their upper ends laterally-outstanding pivot pins 24 coaxially aligned transversely of and well above said frame as a horizontal axis of articulation for a rigid yoke 25 engaged at the spaced extremities of its parallel arms with said pins for oscillation in a vertical arc in embracing relation with the forward portion of the tractor unit. Forwardly of and in clearing relation with the tractor, the arms of the yoke 25 converge, are suitably interbraced, and unite in a blunt nose from which spacedly-parallel webs 26 fixedly and forwardly project on opposite sides of the longitudinal median line of the assembly to define a forwardly-opening throat between vertically-disposed side walls; the said webs 26 preferably being braced to the rearwardly-adjacent yoke 25 members, as by means of gussets 27, for resistance to forces acting between and tending to separate the webs. Powering the yoke 25 for selective actuation throughout the range of its vertical arc oscillation, an hydraulic ram unit 28 suitably parallels and underlies each of the spacedly-parallel arms of said yoke in hinged connection at its ends between a fixed point of the frame 22 or adjacent bracket 23 and a point on the under side of the associated yoke 25 arm forwardly remote from its pivot pin 24, and said rams 28 are similarly and simultaneously served by an hydraulic pressure system common to conventional tractor units through an appropriate control manipulable by the tractor operator in accordance with established practice in a manner to simultaneously extend the rams 28 for elevation of the yoke 25 into a position of upward and forward inclination relative to its mounting pins 24, or, conversely, to retract said rams for lowering of the yoke into a position of forward and downward inclination relative to said pins and to consequent disposition of the yoke webs 26 in ground proximity forwardly of the tractor; such rams, pressure systems, and controls in the operative relationship shown and for the purposes described being so well known in association with tractors as to obviate any occasion for particular elaboration herein.

It is the function of the yoke 25 to mount and variously position earth-working elements, such as shovels and blades, for work-performing reaction to power applied through the tractor, and much of the operative flexibility and practical advantage of the improved attachment derives from the manner and means therein utilized for operatively mounting the blade or shovel in selectively-adjustable, manipulable relation on and for travel with the free end of the yoke altitudinally adjustable about a power-translatable, relatively-elevated, horizontal axis. Conditioning the free end of yoke 25 for supporting engagement with a blade or shovel in the manner and to effect the purposes characterizing the invention, a rectangular gudgeon block 29 is provided of a thickness closely receivable between the yoke end webs 26 and of a depth exceeding that of said webs, and said block is mounted between and for adjustment in a vertical arc relative to said webs on a pin 30 horizontally engaged through the attached ends and adjacent the lower margins of said webs and traversing an eye fixed to the end wall of block 29 along and parallel to the block lower corner remote from the free ends of web 26, said pin 30 and block-affixed eye thus constituting a hinge on which the block 29 is supported between the webs 26 with its leading face advanced beyond the web free ends and about which said block may rock forwardly and downwardly relative to said webs, the web forward extensions slidably bearing against the block 29 side walls to guide and position the block and to resist forces applied to said block with twisting effect thereon. Determinative of the angular adjustment of the block 29 on its hinge pin 30, a threaded tie rod 31 is hinged at one end, as at 32, to the upper, yoke-inward corner of said block and extends rearwardly therefrom along the yoke center line to traverse an eye 33 fixedly upstanding from one of the yoke transverse members, so that nuts 34 threadedly engaged with said tie rod on opposite sides of the eye 33 and in bearing relation thereagainst may be selectively adjusted along the rod to establish and maintain a desired angular adjustment of the block 29 on its hinge pin 30 relative to the plane of the yoke 25. Supplementing the tie rod 31 as a means for holding the block 29 in a position of desired adjustment, and to minimize the effect of stresses and strains otherwise imposed upon said tie rod when the assembly is operated, internally-threaded holes 35 formed in web 26 are centered upon and spaced apart along an arc concentric with the pin 30 in position for individual registration with one or another of an arcuately-spaced series of tapered seats or sockets 36 in the adjacent block face, so that a threaded stud 37 formed with a frusto-conical tip 38 at the end remote from its head may be engaged in and through a hole 35 in registration with a socket 36 and threadedly advanced to firm seated engagement of its tip 38 in the so-registered socket, thereby effectively locking the block 29 to the webs 26 in each of the adjusted block positions.

The block 29 is centrally traversed by a bore perpendicular to the hinge pin 30 and opening through the upper and lower faces of the block for the journaled accommodation of a kingpin 39 whereby the blade or shovel element of the assembly is operatively associated with the yoke 25 and block 29 for arcuately lateral adjustment relative thereto. In the embodiment of the improvement typified by Figures 1, 2, 3 and 4, and for reasons that will be readily manifest, operative association of the blade or shovel element with the block 29, and hence with the yoke 25, is accomplished through the agency of a straight, rigid beam 40, of appropriate length and particular form, from the midlength whereof complementary, spaced, parallel ears 41 fixedly and laterally project in perpendicular relation with the beam and in a separation accommodative of the block 29 depth, said ears 41 being appropriately apertured to receive ends of the kingpin 39 journaled in the block 29 and thereby mount the beam on and forwardly of said block transversely of and for travel with the yoke 25 free end and for lateral, arcuate oscillation in a generally horizontal plane about the kingpin axis. Hinge brackets 42 are spaced along and fixedly outstand from the beam 40 forward face for connection with complementary hinge members 43 fixedly outstanding from the base or heel of a shovel element 44, whereby to mount said element on, in advance of, and for travel with the beam with the element lip paralleling the beam and the element hinged to the beam for oscillation in a vertical arc relative thereto about an axis paralleling and forwardly-adjacent the beam. Mounted as shown and described, the shovel element is conditioned for adjustment about either or both of the perpendicularly-related axes provided by the kingpin 39 and the hinge connection of the members 42 and 43 and is thus manipulable on and with the yoke 25 forward end for a variety of uses and purposes, the advanced disposition of the element 44 lip facilitating its use as an excavating cutting edge and shovel charger when advanced as an incident of tractor translation in an appropriate position of angular adjustment in the vertical plane, the hinge axis provided by the kingpin 39 permitting lateral swing of the shovel to either side of the yoke in either lowered or elevated disposition of the latter, and the hinge axis of the connected members 42 and 43 providing for oscillatory adjustment of the shovel element in the vertical plane and in any operative disposition of the yoke 25 and associated beam 40 between a hopper-constituting elevation of the shovel element lip and such lip depression as effects gravity-induced discharge of the shovel charge or contents.

The hydraulic pressure system of the tractor may be advantageously utilized for regulation and control of the angular adjustment of the shovel element in the manner illustrated and hereinafter described. As shown in Figures 1 and 2, a strut 45 fixedly upstanding from a rearward portion of each yoke arm 25 forwardly adjacent the arm connection with its mounting pin 24 operatively engages at its free upper end with and mounts an hydraulic ram 46. The extensible and retractible end of the ram 46 operatively connects, as at 47, with an end portion of the beam 40 on the same side of the tractor unit, said rams 46 hence being disposed to generally and spacedly overlie the spacedly-parallel arms of the yoke 25 and to diverge forwardly of the assembly, if appropriate, to establish connection of their forward ends with and near the opposite ends of the beam 40. As so mounted and connected, the rams 46 are served by the pressure system of the tractor unit through any conventional, selectively-manipulable control or controls in a manner and arrangement effective to extend one and simultaneously retract the other of said rams for corresponding angular adjustment of the shovel element and its mounting about the kingpin axis in the direction and to the extent desired. In such an arrangement the rams may be utilized in a condition of like extension to brace and reinforce the outer ends of the beam 40 against pressures thereto transmitted from the attached shovel, particularly when said beam is adjusted into perpendicular relation with the tractor longitudinal axis, as represented by Figures 1 and 2. The selectively-manipulable means for regulating and controlling the angular relation of the shovel element 44 relative to its mounting beam 40 may be variously constituted and arranged, but for this purpose it is again expedient to utilize the tractor hydraulic pressure system acting through appropriate means, such as the arrangement shown in Figures 1 and 2. Since the beam 40, ears 41, and shovel element 44 all swing together about the kingpin axis, it is feasible and convenient to mount an hydraulic ram 48 on and to oscillate in a limited vertical arc relative to a rearward portion of the uppermost ear 41 in served relation with the tractor pressure system and in alignment of its extensible and retractable axis perpendicular to and above the beam 40. The end of the reciprocable element of the ram 48 connects with the midportion of a toggle link 49 which extends upwardly and rearwardly from hinged engagement of its lower end on the pintle of one of the hinge elements constituted from the members 42 and 43 to connect the shovel element with the beam. The toggle is completed by means of a link 50 hingedly connecting between the upper end of the link 49 and a point on the shovel element rear wall spacedly above the point of link 49 lower end connection. Thus, the ram 48 being suitable and conventionally served by a branch of the tractor pressure system through a control manipulable by the tractor operator, a relatively short extension of the ram acts and is amplified through the toggle linkage to rock the shovel element 44 on its mounting hinge axis for depression of the shovel lip and retraction of the ram is correspondingly amplified and applied through the toggle linkage to rock said shovel element for elevation of its lip; the hydraulic system and control thus utilized and applied being effective to accomplish close adjustments of the shovel element attitude and to brace and hold said element in any position of its adjustment. Obviously, the pressure system connections to the various rams shown and described will include swivel joints or flexible sections for accommodation of the travel between relatively movable elements of the assembly served by the system, as is characteristic of analogous conventional practice.

When and as desired, a 'dozer blade of any suitable or desired type and construction, such, for example, as the reinforced box blade 51, may be substituted for the shovel element 44, either as a replacement for the shovel element in mounted relation with the beam 40, as shown in Figures 3 and 4, or as a substitute for both the shovel element and the beam, as represented by Figures 5 and 6. When the blade is to be mounted on the beam 40 in replacement for the shovel element, apertured lugs 52 are fixed to outstand from the blade rear face in a disposition and spaced arrangement corresponding with the hinge member 43 mounting on the shovel element, whereby said lugs 52 are adapted for connection with the brackets 42 of the beam 40 to hingedly mount the blade on the beam in the same manner as was the shovel element. Since the uses to which the blade 51 is customarily applied require blade rigidity in the vertical plane rather than the hinged adjustability of the shovel element, ends of the beam 40 are formed with eyes 53 paralleling the kingpin 39 and box brackets 54, or the equivalent, are fixed to outstand from the blade rear face in position to embracingly coact with the eyes 53 and are apertured to each accommodate a pin or bolt 55 receivable in the associated eye and effective to lock the bracket to the corresponding end of beam 40, thereby immobilizing the blade 51 in mounted relation on, forwardly of, and for adjustment with the beam. The operatively rigid interrelation of the blade 51 and beam 40 nullifies any utility of the ram 48 and its toggle linkage, hence, when the blade replaces the shovel element, the ram 48 and links 49 and 50 may be disconnected and removed from the assembly, or, if desired, the link 50 alone may be removed and the ram 48 and link 49 retained in inoperative position ready for reconnection when the shovel element is again mounted on the beam.

Alternative to the foregoing, Figures 5 and 6 show a mounting for the blade 51 which dispenses with the beam 40 and shortens the distance between the blade working face and kingpin 39, with consequent advantages in the application of power to the blade and advantageous shortening of the radius of blade angular adjustment about the kingpin. In the alternative blade mounting, spacedly-parallel ears 56, analogous to and functionally identical with the ears 41 of the beam 40, are fixed to outstand from the longitudinal center of the blade rear face to embracingly receive the block 29 and for hinged connection thereto through the agency of the kingpin 39 in the same manner as characterized the ear 41 connection, thereby mounting the blade directly on the block 29 in substitution for the beam 40. When the beam 40 is removed from the assembly, the forward ends of the rams are disconnected from the beam ends to permit of their reconnection with points on the rear face of the mounted blade, as at 57, corresponding with the previous points of connection 47 adjacent the beam ends, thus conditioning the so-mounted blade 51 for angular adjustment about the kingpin to the same degree and in exactly the same manner characteristic of the beam it replaces.

The functional novelties and practical advantages of the improvement derive in large measure from provision of the angularly-adjustable block 29 to pivotally couple the shovel or blade to the altitudinally-adjustable end of the pusher yoke 25. Through use of the block 29 carrying the kingpin 39 in operative relationship on and with the free end of the yoke 25 shown and described, it is feasible to adjust the angular relation of said block relative to the plane of the yoke and correspondingly vary the angular relation of the kingpin axis to the yoke plane in the longitudinal vertical plane of the assembly. Given a forward and downward adjustment of the block 29 relative to the yoke plane, as indicated in Figures 8 and 10, appropriate elevation of the yoke free end can function to bring the kingpin axis of the so-adjusted block into substantially vertical position, as in Figure 8, so that angular adjustment of the attached shovel element 44 about the so-disposed kingpin axis through the agency of the rams 46 moves the said element arcuately in a horizontal plane, without longitudinal tilting of the element, and from the vertical frontal plane aspect shown in full lines in Figure 9 to one or the other of the broken line positions shown in said latter view, while a lowered position of the yoke free end carrying the so-adjusted block, Figure 10, pitches the kingpin axis to incline its upper end forwardly from the vertical so that angular adjustment of the shovel axis thereabout results in longitudinal tilting of said element proportioned in amount to the degree of element angular deviation from its normally horizontal, transverse disposition and develops the pattern of vertical frontal plane shovel position aspects indicated in Figure 11. Alternatively, with the block 29 adjusted to position the kingpin axis vertically when the yoke free end is lowered, as in Figure 12, the attached blade or shovel element may be swung about the so-disposed axis without deviation from the horizontal and through the vertical frontal plane aspect pattern shown in Figure 13, while elevation of the yoke free end carrying the block 29 as adjusted in Figure 12 tilts the kingpin axis to upward and rearward divergence from the vertical for development of a vertical frontal plane aspect pattern of angularly adjusted blade or shovel element positions similar to that of Figure 11, but opposite as to blade or shovel element longitudinal pitch. The degree of block 29 tilt relative to the yoke plane determines, of course, the amplitude of blade or shovel element longitudinal deviation from the horizontal when angularly adjusted in given altitudinal dispositions of the yoke free end and associated elements, as is exemplified by Figures 14 and 15 in comparison to Figures 12 and 13. Figure 14 represents a yoke free end disposition the same as that of Figure 12 and a block 29 relative adjustment different from that of the latter figure showing and the consequent frontal aspect patterns, Figures 15 and 13, differing in amplitude of element longitudinal tilt to a degree proportioned to the kingpin axis inclination characterizing the block adjustments of the representations from which said frontal aspect views derive.

Other features of the invention of notable practical significance are the elevated position of the yoke axis of articulation and the extensive range of blade or shovel element angular adjustment in the generally horizontal plane consequent upon use of the beam mounting; the features just mentioned being susceptible of advantageous correlation adapting the assembly to efficient use as a side-dump loader. With the shovel element mounted on and associated with the yoke 25 through the agency of the beam 40, as illustrated in Figures 1 and 2, and the block 29 tilted relative to the yoke plane substantially as indicated in Figure 1, it is manifest that lowering of the yoke free end into ground proximity disposes the shovel element to function as an excavator and scoop chargeable with material to be loaded as an incident of tractor advance and that elevation of the yoke free end to the broken line position of Figure 1 lifts the charged shovel element into clearing relation with a bank or truck alongside the tractor and approaches the kingpin 39 axis to the vertical, so that, when in such elevated position, the shovel element and its mounting may be swung by means of the rams 46 through a very considerable arc and to either side of the boom free end without appreciable deviation from the horizontal and into position for side-dump discharge of its contents, through the agency of the ram 48 and associated toggle linkage, upon the bank or into the truck adjacent the tractor, all without manipulation of the tractor away from a straight travel path; the radius of shovel element angular adjustment about the kingpin axis permitting location of the shovel element to discharge almost laterally of the tractor and yoke when the kingpin axis inclination permits the approaching end of the beam 40 to swing over the adjacent yoke shoulder and operating to dispose the shovel element well to the side of the tractor longitudinal median line for delivery of its discharge in clearing relation with the tractor when said element is moved to either of its side-dump limits.

Equipped with the shovel element 44, or with the blade 51 in either of the mountings thereof illustrated and described, the attachment is adaptable through simple adjustment of the block 29 tilt relative to the yoke plane for a variety of particular uses to which the various blade and element attitudes of Figures 8 through 15 are applicable. The adjustments characterizing the attachment condition it for use in the grading and sloping of flat and cambered surfaces, for excavating and cleaning ditches, for clearing and sloping ditch side walls, for forward-dump or side-dump loading of materials, for the construction and clearing of roads, for the clearing of timber from land, and for an extensive range of analogous functions.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. In a tractor attachment of the character described having a yoke hinged at its open end to swing through a vertical arc about an axis transverse of a tractor, tractor-powered rams extensible and retractible in engagement between the tractor and arms of said yoke for elevating and lowering the free end of said yoke, a beam pivotally carried by and forwardly of the yoke free end for adjustment angularly of the tractor travel path, and tractor-powered rams extensible and retractible in engagement between ends of said beam and the corresponding yoke arms for determination of beam angular adjustment, a mounting interconnecting said beam and yoke selectively adjustable to determine and to vary the plane of beam articulation at various positions of beam elevation, said mounting comprising spacedly-parallel, like webs fixedly projecting forwardly from and centrally of the yoke free end, a gudgeon block between and shiftably embraced by said webs, a pin parallel to the yoke axis hingedly engaging the inner lower corner of said block with the roots of said webs, a threaded tie rod hinged at one end to the upper inner corner of said block in slidable engagement of its threaded portion through an eye fixedly upstanding from the yoke rearwardly of said block, nuts on the tie rod threaded portion adjustably engageable against opposite sides of said eye, means for securing said block to said webs in various positions of its angular adjustment about said pin as determined by adjustment of said nuts along the tie rod, complementary ears outstanding rearwardly from the beam midlength in an altitudinal spacing receptive of the block thickness therebetween, said ears being adapted to overlie upper and lower faces of said block, and a kingpin traversing and pivotally interconnecting said ears and block with its axis in a vertical plane perpendicular to the block and yoke hinge axes.

2. In a tractor attachment of the character described having a yoke hinged at its open end to swing through a vertical arc about an axis transverse to a tractor, tractor-powered rams extensible and retractible in engagement between the tractor and arms of said yoke for elevating and lowering the free end of said yoke, a beam pivotally carried by and forwardly of the yoke free end for adjustment angularly of the tractor travel path, and tractor-powered rams extensible and retractible in engagement between ends of said beam and the corresponding yoke arms for determination of beam angular adjustment, a mounting interconnecting said beam and yoke selectively adjustable to determine and to vary the plane of beam articulation at various positions of beam elevation, said mounting comprising spacedly-parallel, like webs fixedly projecting forwardly from and centrally of the yoke free end, a gudgeon block between and shiftably embraced by said webs, a pin parallel to the yoke axis hingedly engaging the inner lower corner of said block with the roots of said webs, a threaded tie rod hinged at one end to the upper inner corner of said block in slidable engagement of its threaded portion through an eye fixedly upstanding from the yoke rearwardly of said block, nuts on the tie rod threaded portion adjustably engageable against opposite sides of said eye, arcuately-spaced holes in the web end portions overlying the block sides, arcuately-spaced, tapered seats in the block sides disposed for registration with said holes as an incident of block adjustment about its hinge pin, tapered-end studs threadedly receivable through said holes and within seats registered therewith, complementary ears outstanding rearwardly from the beam midlength in an altitudinal spacing receptive of the block thickness therebetween, said ears being adapted to overlie upper and lower faces of said block, and a kingpin traversing and pivotally interconnecting said ears and block with its axis in a vertical plane perpendicular to the block and yoke hinge axes.

References Cited in the file of this patent

UNITED STATES PATENTS

| Number | Name | Date |
|---|---|---|
| 2,160,595 | LeBleu | May 30, 1939 |
| 2,312,390 | Cordes | Mar. 2, 1943 |
| 2,404,619 | Coates | July 23, 1946 |
| 2,426,410 | Owen | Aug. 26, 1947 |
| 2,451,101 | Leschinsky | Oct. 12, 1948 |